US009244999B2

(12) United States Patent
Jin et al.

(10) Patent No.: US 9,244,999 B2
(45) Date of Patent: Jan. 26, 2016

(54) DATABASE QUERY USING A USER-DEFINED FUNCTION

(71) Applicant: International Business Machines Corporation, Armonk, NY (US)

(72) Inventors: Yi Jin, Beijing (CN); Lei Li, Beijing (CN); Chun E. Ma, Beijing (CN); Li Li Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/744,676

(22) Filed: Jan. 18, 2013

(65) Prior Publication Data

US 2013/0226889 A1  Aug. 29, 2013

(30) Foreign Application Priority Data

Feb. 27, 2012  (CN) .......................... 2012 1 0046498

(51) Int. Cl.
G06F 17/30  (2006.01)
(52) U.S. Cl.
CPC .... G06F 17/30595 (2013.01); G06F 17/30557 (2013.01)
(58) Field of Classification Search
None
See application file for complete search history.

(56) References Cited

U.S. PATENT DOCUMENTS

| 5,379,419 | A | 1/1995 | Heffernan et al. |
| 5,819,251 | A | 10/1998 | Kremer et al. |
| 5,963,933 | A | 10/1999 | Cheng et al. |
| 5,987,453 | A | 11/1999 | Krishna et al. |
| 6,167,399 | A | 12/2000 | Hoang |
| 6,385,604 | B1 | 5/2002 | Bakalash et al. |
| 7,216,126 | B2 | 5/2007 | Choy |
| 2004/0199636 | A1* | 10/2004 | Brown et al. .................. 709/227 |
| 2004/0255006 | A1* | 12/2004 | Collet et al. .................. 709/218 |
| 2012/0131654 | A1* | 5/2012 | Kavantzas et al. ................ 726/6 |

FOREIGN PATENT DOCUMENTS

CN  1694064  11/2005

OTHER PUBLICATIONS

"Consuming Web Service Using ASP.NET AJAX," www.bipinjoshi. net webpage, archived on archive.org on Nov. 24, 2010.*
"All About Web Service in .Net", dotnetguts.blogspot.com webpage, Sep. 22, 2007.*
Wang et al., "A distributed big data storage and data mining framework for solar-generated electricity quantity forecasting," Photonics and Optoelectronics Meetings 2011, International Society for Optics and Photonics, Nov. 2011.*
P. Mishra, et al., "Join Processing in Relational Databases," ACM Computing Surveys, vol. 24, No. 1, Mar. 1992, 51 pages.

(Continued)

Primary Examiner — Jay Morrison
(74) Attorney, Agent, or Firm — Cantor Colburn LLP

(57) ABSTRACT

A database query by using a user-defined function (UDF) is provided. A computer-implemented method for performing the database query by using the UDF includes detecting whether a command for invoking the UDF to transmit a parameter value has been received. Based on detecting that the command for invoking the UDF to transmit the parameter value has been received: a first interface of the UDF is started; the parameter value is received through the first interface; and the received parameter value is transmitted to an external data source. The method further includes returning to detecting whether the command for invoking the UDF to transmit the parameter value has been received.

12 Claims, 3 Drawing Sheets

(56) References Cited

OTHER PUBLICATIONS

L. Gravano, et al., "Text Joins for Data Cleansing and Integration in an RDBMS," Proceedings of the 19th International Conference on Data Engineering, Mar. 5-8, 2003 IEEE, 3 pages.

Z. Wei-ping, et al., "Using MongoDB to Implement Textbook Management System instead of MySQL," May 27-29, 2011 IEEE 3rd International Conference, pp. 303-305.

CN Application No. 201210046498.6 Office Action dated Oct. 28, 2015, 6 pages.

* cited by examiner

DATABASE QUERY USING A USER-DEFINED FUNCTION

PRIORITY

The present application claims priority to Chinese Patent Application No. 201210046498.6, filed on 27 Feb. 2012, and all the benefits accruing therefrom under 35 U.S.C. §119, the contents of which in its entirety are herein incorporated by reference.

BACKGROUND

Embodiments of the present invention generally relate to database systems, more particularly, to performing a database query by using a user-defined function (UDF).

With the increase of data amounts and constant changing of users' needs, various "not only structured query language" (NoSQL) systems that are different from traditional relational database management systems (RDBMS) continuously emerge. Different from a traditional relational database that provides SQL structuralized query and guarantee of atomicity, consistency, isolation, durability (ACID), a NoSQL system does not use SQL as the query language. Its common features are non-relational data storage, simple application programming interface (API), final consistency guarantee and good horizontal scalability, which makes a NoSQL system become an ideal platform for resolving large data storage, large data query, and analysis in a cloud computing platform.

Current NoSQL systems can support a simple query to a large-scale data sheet, for example, a query based on a primary key. However, for an associated query containing one or more large-scale data sheets, NoSQL systems cannot effectively provide support. Usually applications can only realize NoSQL-based complex association support through a large amount of targeted development. This method is not flexible, has high development costs, and performance cannot be guaranteed. Based on the respective advantages of RDBMS and NoSQL, the two can be combined. Key data required for an associated query is stored in a relational database, and large scale and complete data are stored in a NoSQL system, so as to improve the associated query performance on a large scale data sheet by a mix and match approach. In currently existing possible mix and match approaches, the data interaction between RDBMS and NoSQL data sources has a performance bottleneck.

SUMMARY

Embodiments include a computer-implemented method for performing a database query by using a user-defined function (UDF). The method includes detecting whether a command for invoking the UDF to transmit a parameter value has been received. Based on detecting that the command for invoking the UDF to transmit the parameter value has been received: a first interface of the UDF is started, the parameter value is received through the first interface, and the received parameter value is transmitted to an external data source. The method further includes returning to detecting whether the command for invoking the UDF to transmit the parameter value has been received.

Another embodiment includes a system for performing a database query by using a user-defined function (UDF). A detecting unit is configured to detect whether a command for invoking the UDF to transmit a parameter value is received. A transmitting unit is configured to start a first interface of the UDF, in response to determining that the detecting unit detects the command for invoking the UDF to transmit a parameter value. The transmitting unit is further configured to receive a parameter value through the first interface and transmit the received parameter value to the external data source. A returning unit is configured to return to detect whether the command for invoking the UDF to transmit a parameter is received.

A further embodiment includes a computer program product for performing a database query by using a user-defined function (UDF). The computer program product includes a computer readable storage medium having computer readable program code embodied therewith. The computer readable program code includes computer readable program code configured to perform a method. The method includes detecting whether a command for invoking the UDF to transmit a parameter value has been received. Based on detecting that the command for invoking the UDF to transmit the parameter value has been received: a first interface of the UDF is started, the parameter value is received through the first interface, and the received parameter value is transmitted to an external data source. The method also includes returning to detecting whether the command for invoking the UDF to transmit the parameter value has been received.

BRIEF DESCRIPTION OF THE SEVERAL VIEWS OF THE DRAWINGS

Through the more detailed description of embodiments of the present disclosure below when read in conjunction with the accompanying drawings, the above and other objects, features and advantages of the present disclosure will become more apparent, wherein the same reference numerals generally refer to the same elements in the embodiments of the present disclosure.

DETAILED DESCRIPTION

Embodiments are described in more detail with reference to the accompanying drawings, in which exemplary embodiments of the present disclosure are illustrated. However, it is to be understood that the present disclosure can be implemented in various manners and should not be limited to the embodiments disclosed herein. To the contrary, embodiments are provided for a thorough and complete understanding of the present disclosure, and to completely convey the scope of the present disclosure to those skilled in the art.

Figure 1:
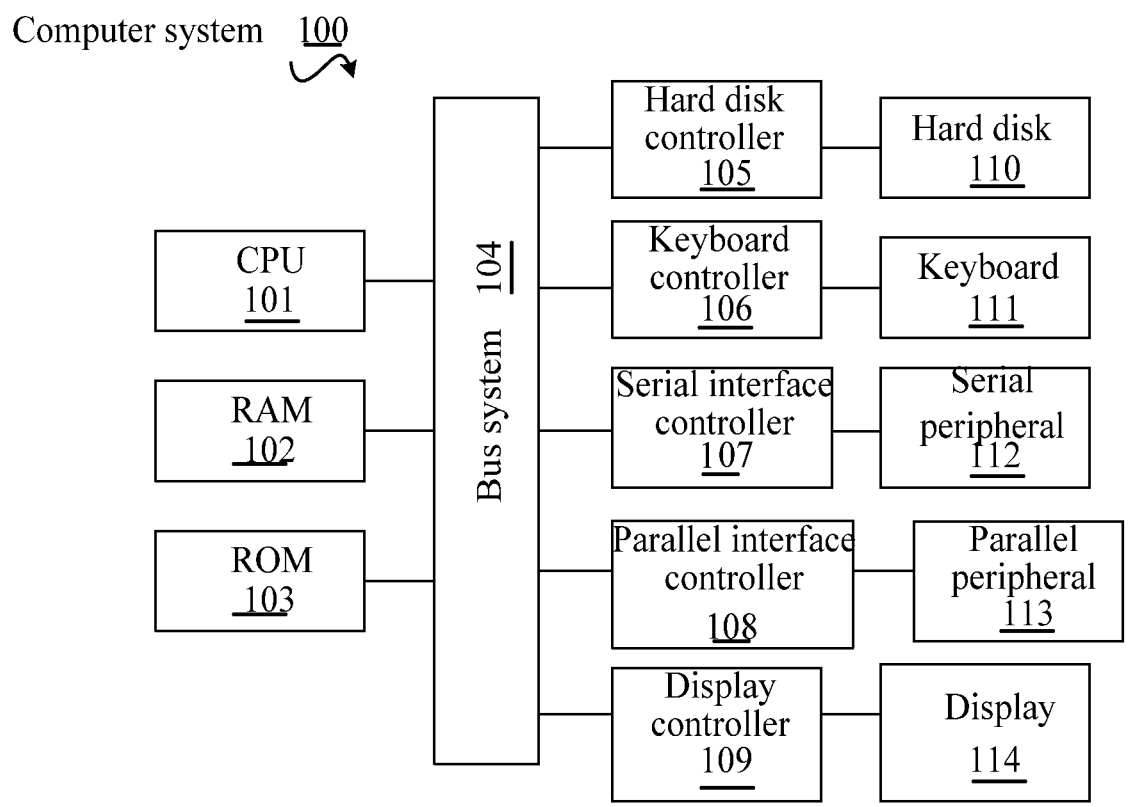
FIG. 1 shows a block diagram of an exemplary computing system according to embodiments.

FIG. 1 shows a block diagram of an exemplary computing system 100 adapted to realize exemplary embodiments. As shown in FIG. 1, the computer system 100 may include: CPU (Central Processing Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for exemplary purposes rather than any limitation to the present invention. In some cases, some devices may be added to or removed from the computer system 100 based on specific situations.

As will be appreciated by one skilled in the art, embodiments may be a system, method or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to embodiments of this disclosure, a user-defined function (UDF) is used to realize data interaction between relational database management systems (RDBMS) and "not only structured query language" (NoSQL) systems in a mix and match approach, where a first interface is defined for the UDF. In response to receiving a command for invoking the UDF to transmit a parameter value, the parameter value is transmitted. A second interface is defined for the UDF. In response to detecting that data can be received, data is received from an external data source. In a runtime environment, RDMBS creates a UDF space for the UDF, including initializing the UDF, creating a buffer for storing data received from an external data source, creating necessary worker threads or processes. Assuming the base class of the UDF is AUDF, it can be defined, e.g., in the following manner:

```
class myAUDF extends AUDF
{
    public void send (<argument list>);
    public void recv ( )
}
``` wherein, method send(<argument list>) corresponds to the first interface of the UDF, i.e., for, in response to receiving a command for invoking the UDF to transmit a parameter value, transmitting the parameter value. Method recv( ) corresponds to the second interface of the UDF, i.e., for, in response to being able to receive data, receiving data from an external data source.

For example, the UDF can be registered by invoking the following CREATE FUNCTION statement:
CREATE FUNCTION sampleAsyncUDF (out varchar(100))
RETURNS TABLE (key varchar(20), val VARCHAR(120))
EXTERNAL NAME '<method specification>' EXTERNAL ACTION
wherein <method specification>designates the aforesaid first interface and second interface of the UDF, similar to "jar-file.AsyncUDF!send!recv". In this way, the first interface corresponds to AsyncUDF::send( ), and the second interface corresponds to AsyncUDF::recv( ). It will be understood that the above example is only for the purpose of illustration, and any other possible methods may be used to define the UDF. The above examples are not to be interpreted as limitations to the present disclosure.

Figure 2:
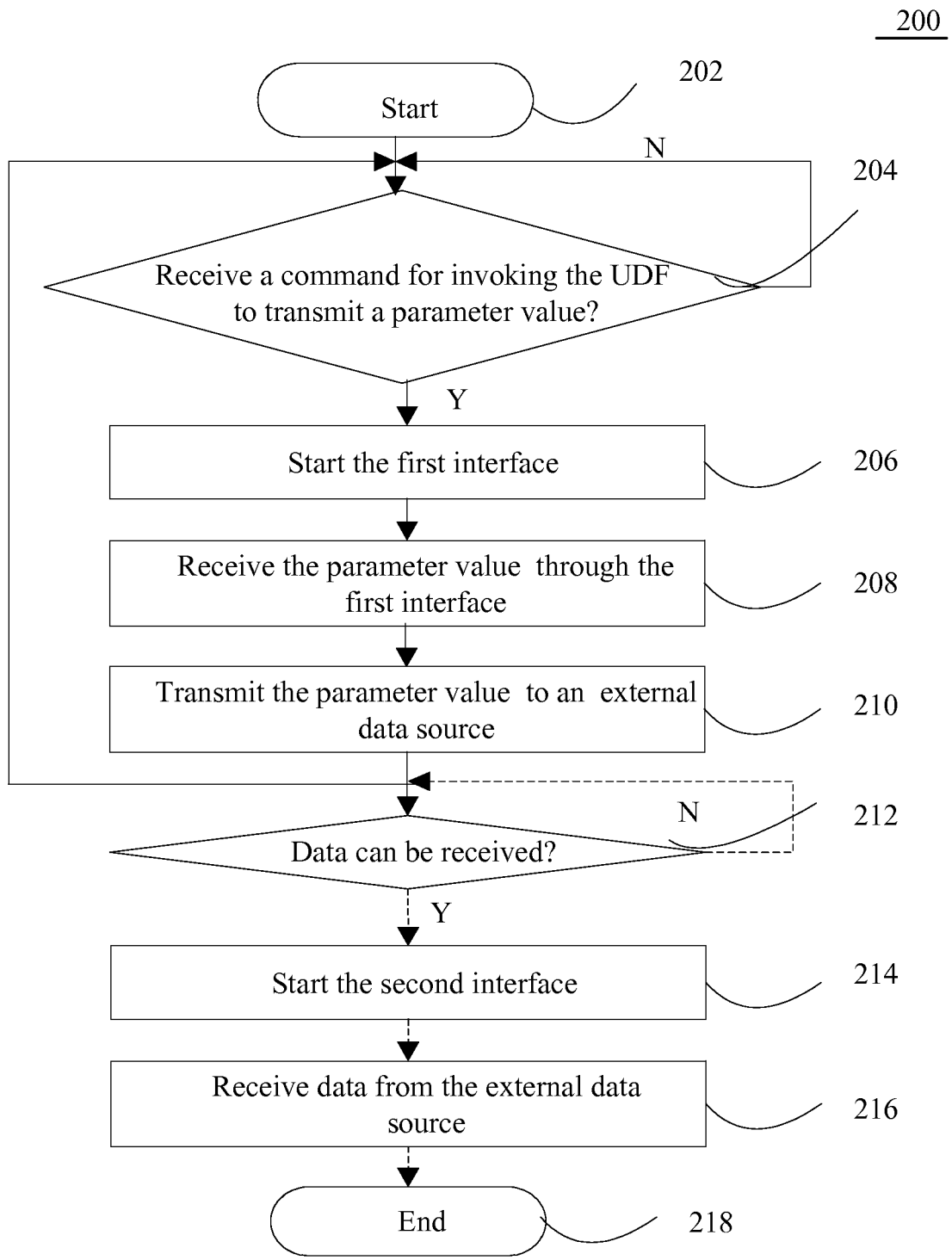
FIG. 2 shows a flow chart of a computer-implemented method for performing a database query by using a user-defined function according to an embodiment.

Now referring to FIG. 2, a flow chart of a computer-implemented method 200 is depicted for performing a database query by using a UDF according to an embodiment of present disclosure. Method 200 starts from block 202.

Next, method 200 proceeds to block 204, where it is detected whether a command for invoking the UDF to transmit a parameter value is received. If not, method 200 returns to block 204 to detect whether the command for invoking the UDF to transmit a parameter value is received. If so, method 200 proceeds to block 206, wherein the first interface of the UDF is started.

Next, block 200 proceeds to block 208, wherein the parameter value is received through the first interface.

Next, method 200 proceeds to block 210, wherein the parameter value is transmitted to an external data source.

Next, method 200 proceeds to block 212, wherein it returns to detect whether the command for invoking the UDF to transmit a parameter value is received.

With reference to the above example, in a runtime environment, when it is needed to transmit a parameter value through the UDF, RDBMS will invoke the UDF. Correspondingly, the UDF will detect whether a command for invoking the UDF to transmit a parameter value is received. If not, the method returns to detect whether the command for invoking the UDF to transmit a parameter value is received. If the command for invoking the UDF to transmit a parameter value is received, the UDF will start the first interface, i.e., AsyncUDF::send( ) in the above example, to receive the parameter value transmitted by RDBMS. Then, the parameter value is transmitted to an external data source, which is usually a NoSQL data source here. According to the definition of the UDF, after receiving the parameter value and transmitting the parameter value to the external data source is completed, the method returns to detect whether the command to invoke the UDF to transmit a parameter value is received. Traditionally, after a UDF receives a parameter value and transmits the parameter value to an external data source, it usually waits to receive data obtained from the external data source, and only after receiving the data obtained from the external data source, can it return to detect whether the command for invoking the UDF to transmit a parameter value is received. However, according to the present disclosure, there is no need to wait to receive data obtained from the external data source, and directly return to detect whether the command for invoking the UDF to transmit a parameter value is received. Since there is no need to wait to receive data obtained from the external data source, the interaction performance between the RDBMS and the NoSQL data source is improved. It will be understood that the above example is only for illustration, rather than a limitation to the present disclosure.

Referring to FIG. 2 again, according to another embodiment of the present disclosure, method 200 for performing a database query by using a user-defined function (UDF) further includes:

Block 214, wherein it is detected whether data can be received; if not, method 200 returns to detect whether data can be received. If so, method 200 proceeds to block 216, wherein the second interface of the UDF is started.

Next method 200 proceeds to block 218, wherein data is received from the external data source through the second interface, where the received data was obtained by using the parameter value.

With reference to the above example again, in a runtime environment, it is regularly detected whether data can be received. If the data can be received, UDF will start the second interface, i.e., AsyncUDF::recv( ) in the example given above, to receive the data from the external data source. Here the external data source is usually a NoSQL data source. The data received from the external data source was obtained by using the aforesaid parameter value transmitted by the above first interface. According to this disclosure, the UDF receiving the data obtained from the external data source and its transmitting of the parameter value to the external data source are isolated and asynchronous, and thus this can effectively eliminate the performance bottleneck in the traditional manner, so that the interaction performance between the RDBMS and the NoSQL data source is improved. It should be appreciated that the example given above is only for illustration, rather than limitation to the present disclosure.

According to an embodiment of the present disclosure, method 200 for performing a database query by using a user-defined function (UDF) further includes: storing the data received from the external data source. For example, the buffer in the UDF space may be used to store the data received from the external data source.

According to an embodiment of the present disclosure, method 200 for performing a database query by using a user-defined function UDF further includes: detecting whether there is stored data received from the external data source; if so, providing data received from the external data source. For example, it may be detected whether there is stored data received from the external data source by detecting the buffer in the UDF area. The data received from the external data source may be provided by copying the buffer contents in the UDF space.

According to an embodiment of the present disclosure, method 200 for performing a database query by using a user-defined function (UDF) further includes removing the data received from the external data source that has been provided.

Above is described a method for performing a database query by using a user-defined function in conjunction with a plurality of embodiments of the present disclosure. In the following, a system is described for performing a database query by using a user-defined function (UDF) in conjunction with FIG. 3.

Figure 3:
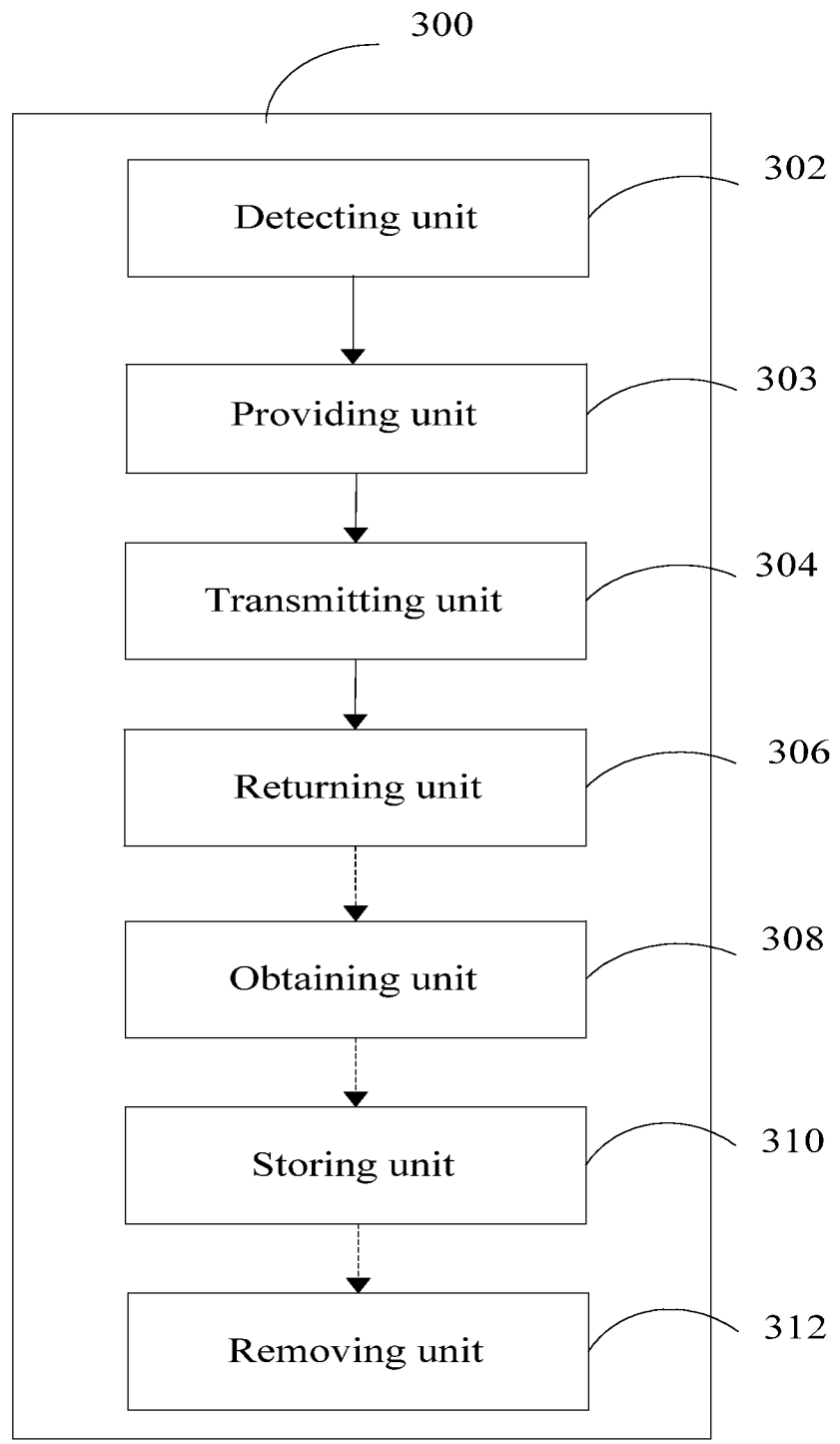
FIG. 3 shows a block diagram of a system for performing a database query by using a user-defined function according to an embodiment.

Now referring to FIG. 3, it shows a block diagram of a system 300 for performing a database query by using a user-defined function (UDF) according to an embodiment of the present disclosure. System 300 includes: a detecting unit 302 configured to detect whether a command for invoking the UDF to transmit a parameter value is received; a transmitting unit 304 configured to perform, in response to determining that the detecting unit 302 detects that the command for invoking the UDF to transmit a parameter value is received: start a first interface of the UDF; receive the parameter value through the first interface; transmit the received parameter value to an external data source; and a returning unit 306 configured to return to detect whether the command for invoking the UDF to transmit a parameter value is received.

According to an embodiment of the present disclosure, the detecting unit 302 is further configured to detect whether data can be received, system 300 for performing a database query by using a user-defined function (UDF) further includes: an obtaining unit 308 configured to perform, in response to determining that the detecting unit 302 detects that data can be received: start a second interface of the UDF; and receive data from the external data source through the second interface, wherein the received data was obtained by using the parameter value.

According to an embodiment of the present disclosure, system 300 for performing a database query by using a user-defined function (UDF) further includes a storing unit 310 configured to store the data received from the external data source.

According to an embodiment of the present disclosure, the detecting unit 302 is further configured to detect whether there is stored data received from the external data source. The system 300 for performing a database query by using a user-defined function (UDF) further includes: a providing unit 303 configured to provide data received from the external data source, in response to determining that the detecting unit 302 detects that there is stored data received from the external data source.

According to an embodiment of the present disclosure, system 300 for performing a database query by using a user-defined function (UDF) further includes a removing unit 312 configured to remove the data received from the external data source that has been provided.

To further summarize, according to an embodiment, a computer-implemented method for performing a database query by using a user-defined function (UDF) is provided. The method includes detecting whether a command for invoking the UDF to transmit a parameter value is received. If so, a first interface of the UDF is started. The parameter value is received through the first interface. The received parameter value is transmitted to an external data source. The method returns to detect whether the command for invoking the UDF to transmit a parameter value is received. The method may also include detecting whether the data can be received. If so, a second interface of the UDF is started. Data are received from the external data source through the second interface. The received data are obtained by using the parameter value.

According to an embodiment, a system for performing a database query by using a UDF is provided. The system includes a detecting unit configured to detect whether a command for invoking the UDF to transmit a parameter value is received. The system also includes a transmitting unit configured to perform, in response to determining that the detecting unit detects that the command for invoking the UDF to transmit a parameter value is received: starting a first interface of the UDF; receiving the parameter value through the first interface; and transmitting the received parameter value to an external data source. A returning unit is configured to return to detect whether the command for invoking the UDF to transmit a parameter value is received.

The detecting unit may be further configured to detect whether the data can be received. The system further includes an obtaining unit configured to perform, in response to determining that the detecting unit detects that the data can be received, starting a second interface of UDF and receiving data from the external data source through the second interface, wherein the received data was obtained by using the parameter value.

In addition, embodiments also provide a computer program product corresponding to the above methods.

By using one or more embodiments, data interaction performance between RDBMS and NoSQL data sources can be improved effectively.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing a database query by using a user-defined function (UDF), comprising:
    detecting whether a command for invoking the UDF, by a relational database management system (RDBMS), to transmit a parameter value has been received;
    based on detecting that the command for invoking the UDF to transmit the parameter value has been received:
        starting a first interface that is a transmitting interface of the UDF;
        receiving the parameter value through the first interface;
        transmitting the received parameter value through the first interface to an external data source; and
        returning to detecting whether the command for invoking the UDF to transmit the parameter value has been received;
    detecting whether data can be received;
    based on detecting that the data can be received:
        starting a second interface that is a receiving interface of the UDF, the second interface operating asynchronously with respect to the first interface, and the first and second interfaces are threads of the UDF created by the RDBMS;
        creating, by the RDBMS, a buffer in the UDF at runtime;
        receiving the data from the external data source through the second interface, wherein the received data is obtained from the external data source in response to the transmitting of the received parameter value to the external data source through the first interface; and
        storing, by the second interface, the data received from the external data source into the buffer;

detecting whether stored data has been received from the external source based on monitoring the buffer; and based on detecting that the stored data has been received from the external data source, providing the data received from the external data source by copying contents of the buffer.

2. The computer-implemented method of claim 1, further comprising:

removing the data received from the external data source which has been provided.

3. The computer-implemented method of claim 1, wherein the UDF returns to detecting whether the command for invoking the UDF to transmit the parameter value has been received without waiting for the data to be received by the second interface of the UDF in response to transmitting the received parameter value through the first interface to the external data source.

4. The computer-implemented method of claim 1, wherein the external data source is a not-only structured query language (NoSQL) system.

5. A system for performing a database query by using a user-defined function (UDF), comprising:

a detecting unit configured to detect whether a command for invoking the UDF, by a relational database management system (RDBMS), to transmit a parameter value is received and whether data can be received;

a transmitting unit configured to perform, in response to determining that the detecting unit detects the command for invoking the UDF to transmit a parameter value:

start a first interface that is a transmitting interface of the UDF;

receive a parameter value through the first interface; and transmit the received parameter value through the first interface to the external data source;

a returning unit configured to return to detect whether the command for invoking the UDF to transmit a parameter is received;

an obtaining unit configured to perform, in response to determining that the detecting unit detects that the data can be received:

start a second interface that is a receiving interface of the UDF, the second interface operating asynchronously with respect to the first interface, and the first and second interfaces are threads of the UDF created by the RDBMS; and receive data from the external data source through the second interface, wherein the received data is obtained from the external data source in response to the transmitting of the received parameter value to the external data source through the first interface;

a storing unit configured to store, by the second interface, the data received from the external data source into a buffer, wherein the RDBMS creates the buffer in the UDF at runtime;

wherein the detecting unit is further configured to detect whether there is stored data received from the external data source based on monitoring the buffer; and a providing unit configured to provide the data received from the external data source, in response to determining that the detecting unit detects that there is stored data received from the external data source by copying contents of the buffer.

6. The system of claim 5, further comprising:

a removing unit configured to remove the data received from the external data source which has been provided.

7. The system of claim 3, wherein the system returns to detecting whether the command for invoking the UDF to transmit the parameter value has been received without waiting for the data to be received by the second interface of the UDF in response to transmitting the received parameter value through the first interface to the external data source.

8. The system of claim 5, wherein the external data source is a not-only structured query language (NoSQL) system.

9. A computer program product for performing a database query by using a user-defined function (UDF), the computer program product comprising:

a computer readable storage medium having computer readable program code embodied therewith, the computer readable program code comprising computer readable program code configured to perform a method comprising:

detecting whether a command for invoking the UDF, by a relational database management system (RDBMS), to transmit a parameter value has been received;

based on detecting that the command for invoking the UDF to transmit the parameter value has been received:

starting a first interface that is a transmitting interface of the UDF;

receiving the parameter value through the first interface;

transmitting the received parameter value through the first interface to an external data source; and returning to detecting whether the command for invoking the UDF to transmit the parameter value has been received;

detecting whether data can be received;

based on detecting that the data can be received:

starting a second interface that is a receiving interface of the UDF, the second interface operating asynchronously with respect to the first interface, and the first and second interfaces are threads of the UDF created by the RDBMS;

creating, by the RDBMS, a buffer in the UDF at runtime;

receiving the data from the external data source through the second interface, wherein the received data is obtained from the external data source in response to the transmitting of the received parameter value to the external data source through the first interface; and storing, by the second interface, the data received from the external data source into the buffer;

detecting whether stored data has been received from the external data source based on monitoring the buffer; and based on detecting that the stored data has been received from the external data source, providing the data received from the external data source by copying contents of the buffer.

10. The computer program product of claim 9, further comprising:

removing the data received from the external data source which has been provided.

11. The computer program product of claim 9, wherein the UDF returns to detecting whether the command for invoking the UDF to transmit the parameter value has been received without waiting for the data to be received by the second interface of the UDF in response to transmitting the received parameter value through the first interface to the external data source.

12. The computer program product of claim 9, wherein and the external data source is a not-only structured query language (NoSQL) system.

* * * * *